United States Patent
Engl

(10) Patent No.: US 6,893,083 B2
(45) Date of Patent: May 17, 2005

(54) MOTOR VEHICLE ROOF WITH A COVER WHICH CAN BE MOVED TO THE REAR OVER THE ROOF SKIN

(75) Inventor: Andreas Engl, Munich (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/648,441

(22) Filed: Aug. 27, 2003

(65) Prior Publication Data

US 2004/0041441 A1 Mar. 4, 2004

(30) Foreign Application Priority Data

Aug. 29, 2002 (DE) .......................................... 102 39 863

(51) Int. Cl.[7] .............................................. B60J 7/047
(52) U.S. Cl. .................................................. 296/216.03
(58) Field of Search ....................... 296/216.01, 216.03, 296/223

(56) References Cited

U.S. PATENT DOCUMENTS

| | | | | |
|---|---|---|---|---|
| 4,786,102 A | * | 11/1988 | Sakamoto et al. | ..... 296/216.03 |
| 4,968,088 A | | 11/1990 | Schürmann | |
| 6,158,803 A | | 12/2000 | Reihl et al. | |
| 6,174,024 B1 | * | 1/2001 | Kronseder et al. | ..... 296/216.03 |
| 6,547,320 B2 | * | 4/2003 | Kohout et al. | .............. 296/223 |

FOREIGN PATENT DOCUMENTS

| | | | |
|---|---|---|---|
| DE | 42 38 946 C 1 | 11/1993 | |
| DE | 197 13 347 C1 | 5/1999 | |
| DE | 100 63 924 | 8/2002 | |
| DE | 102 11 860 | 10/2003 | |
| JP | 61-06126 | 1/1986 | |
| JP | 403010934 | * 1/1991 | ............ 296/216.03 |
| JP | 405278468 | * 10/1993 | ............ 296/216.03 |

OTHER PUBLICATIONS

European Search Report dated Feb. 2, 2004.

* cited by examiner

*Primary Examiner*—Dennis H. Pedder
(74) *Attorney, Agent, or Firm*—Nixon Peabody LLP; David S. Safran

(57) ABSTRACT

A motor vehicle roof with a roof opening which in the roof skin (20, 22), a cover (14) and an displacement mechanism for moving the cover (14) between the closed position which closes the roof opening, a ventilation position in which the cover pivoted upward with its rear edge above the roof skin (20, 22), and an open position in which the cover (14) is pushed rearwar over the roof skin (20, 22) and is supported at its rear area by a support lever (28) which is coupled at one end to the rear area of the cover (14) and is guided at an opposite end in a guide rail (26) which is located underneath the roof skin (20, 22). To make provide greater freedom in the configuration of the lateral edge area of the roof, the support lever (28) and the guide rail (26) are located essentially transversely centrally.

12 Claims, 4 Drawing Sheets

MOTOR VEHICLE ROOF WITH A COVER WHICH CAN BE MOVED TO THE REAR OVER THE ROOF SKIN

BACKGROUND OF THE INVENTION

1. Field of the Invention

The invention relates to a motor vehicle roof having a roof opening which is made in the roof skin, a cover and a displacement mechanism for moving the cover between a closed position which closes the roof opening, a ventilation position in which the cover is in its front end position with its rear edge pivoted upward about a pivot axis located near its front edge so that the rear edge is higher than the roof skin, and an open position in which the cover is pushed to the rear so as to at least partially extend over the roof skin supported on by a support lever which, on the one hand, is coupled to the rear area of the cover, and on the other hand, is guided in a guide rail which is located underneath the roof skin. The invention is also directed to a motor vehicle which such a roof.

2. Description of Related Art

A motor vehicle roof (sliding and lifting roof) of the above mentioned type is known, for example, from German Patent DE 197 13 347 C1. In the raised state pushed to the rear, the cover of this known roof is supported by means of two support levers which are coupled laterally in the area of the rear edge of the roof, with lower ends that are movable in guides which are located underneath the level of a fixed roof skin, and when the support levers are raised, they partially displace a flexible sealing element which, viewed in the transverse direction of the motor vehicle roof, is located between the respective side member of the motor vehicle body and a fixed roof window. This roof window forms a section of the fixed roof skin which is located behind the roof opening. The laterally outer area of the sealing element is also used as a decorative or equalizing screen between the side member which is curved and the side edge of the fixed roof plate which is generally straight.

In a similar known construction, the decorative or equalizing screen is formed by a separate part which extends between a displaceable sealing element and the side member.

In known motor vehicle roofs, freedom in the configuration of the side edge area of the roof is greatly limited by the presence of the lateral guide rail. The arrangement of the guide rail in the transverse direction of the motor vehicle roof, viewed between the respective side member and a fixed roof plate, dictates a relatively great width of the sealing element or of the compensation screen in order to close the roof trough which is typically located at this point toward the side member. Moreover, the lateral edge of the fixed roof plate or of the cover cannot be designed to extend into the area of the side member.

SUMMARY OF THE INVENTION

A primary object of this invention is to provide a motor vehicle roof of the initially mentioned type which offers greater freedom in the configuration of the lateral edge area of the roof.

This object is achieved by a motor vehicle roof of the initially mentioned type in which the support lever and the guide rail, viewed in the transverse direction of the motor vehicle roof, are located essentially in the center of the roof.

Thus, the necessity of supporting the cover on its side edges is eliminated so that, in this area, installation space for a guide rail together with the support lever and the components for fixing the guide rail are not necessary. This eliminates the necessity of an overly wide decorative screen on the side edge of the roof and it is especially possible to provide a cover which extends laterally into the area of the side member. This is of interest mainly in an execution of the roof as a so-called "panorama roof", i.e., in a roof surface which is for the most part transparent. For a relatively wide cover, it is possible to provide a fixed roof plate with the same width as the cover without structural problems, so that the cover and roof plate are flush viewed in the lengthwise direction of the roof. This improves the appearance of the motor vehicle roof.

Another advantage of the invention is that, when using a single (central) guide rail together with the support levers, relative to the aforementioned prior art, a guide rail together with support levers is eliminated. Therefore, the structure can be simplified. However, to increase the support strength, it is also fundamentally possible to provide two support levers which are combined on the center line of the vehicle into a central support unit that is moved in two separate or one central guide rail.

To arrange the guide rail underneath the roof skin, for example, a fixed roof skin, it is conceivable to make this roof skin in one piece and to provide it with a groove which runs in the lengthwise direction for lowered accommodation of the guide rail. This version offers inherent advantages with respect to the water-tightness of the motor vehicle roof (or "water management") since such a roof skin provided with a groove can easily perform a water drainage function without special sealing measures. However, the guide rail, in this case, can be covered by a flexible sealing element which is at least partially displaced by a support lever which emerges upward when the cover is raised and moved. Such a sealing element can contribute to the appearance of a smooth surface of the motor vehicle roof and will then also essentially serve the aesthetics of the roof.

In an alternative embodiment, the portion of the roof skin located behind the roof opening is divided to provide a gap for passage of the support lever, for example, in the form of two fixed motor vehicle roof elements, the gap being a joint which runs in the lengthwise direction, and under which the guide rail is located. For example, it can be attached to the fixed elements directly or by means of a carrier part. A water drainage function can be created in this embodiment by the guide rail itself and/or the optionally provided carrier. With respect to water-tightness as well as visual appearance, in this embodiment, a flexible sealing element, as mentioned above (for covering the gap), is again advantageous.

The area of the motor vehicle roof located behind the roof opening can be made as a permanently installed, stationary roof skin section. Alternatively, in this area there, can also be a movable roof skin section, for example, the aforementioned two stationary rear motor vehicle roof elements can be completely removable from the roof frame area of the motor vehicle body and/or in the installed state can be pivoted out of the plane of the roof skin and/or can be supported to be able to be raised or lowered in the roof skin. In this alternative, the guide rail can be attached, for example, to a fixed crosspiece of the roof which runs in the lengthwise direction of the motor vehicle (on the central longitudinal axis of the motor vehicle).

A gap for passage of the support lever can alternatively also be made as the slot of a one-piece rear roof plate which extends from the rear edge of the roof opening into the middle area of this roof plate. Therefore, the gap need not necessarily extend to the rear as far as the rear cross support of the roof frame of the motor vehicle body.

In one special embodiment, it is provided that the section of the roof skin which is located behind the roof opening is formed by a transparent roof plate (with a lengthwise guide or lengthwise groove, for example, in two parts) which extends laterally into the area of the side member of the vehicle body. Such a roof plate which is made, for example, of glass or plastic can be, for example, of a one-piece construction with a receiving groove for accommodating the guide rail or in two parts with a guide rail which is located underneath the separating joint. In any case, this version enables especially high light translucency of the rear motor vehicle roof area.

Extending the roof plate "into the area of the side member" means especially that the side roof plate edge at least partially overlaps the end section of the respective side member, which section faces inward. In current side member structures, such an inside section of the member is formed, for example, by a support edge which runs essentially horizontally and which can be used, for example, as the support surface for a motor vehicle roof which is made as a prefabricated module.

In another preferred embodiment, the cover is transparent. This cover can also advantageously extend into the area of the side member in order to ensure high light translucency in the front motor vehicle roof area.

In another preferred embodiment, both the section which is located behind the roof opening (for example, a fixed roof skin section) and also the cover are transparent. The motor vehicle roof can then be made as a panorama roof in which most of the roof surface is transparent. In this version, to achieve a pleasing visual appearance, the roof section and the cover should be made of the same (transparent) material.

To further improve the appearance, it is advantageous to form the rear roof skin section as a roof plate with a width which corresponds to the width of the cover and with a side edge which runs in a straight line and is continued flush forward by the side edge of the cover. By the support of the cover in accordance with the invention, this common side edge can then run very far to the outside, viewed in the transverse direction of the motor vehicle, and especially, can overlap the support edge of the side member of the vehicle body. A decorative strip for bridging the roof trough can then be designed to be very narrow or can be completely eliminated if the side member has a straight side wall.

For economical motor vehicle installation, it is advantageous if the rear roof skin section is made on a prefabricated module which can be installed in the roof frame of a vehicle body and on which the guide rail is already integrated. This roof module can have, in the conventional manner, joining surfaces on the edge area for attachment (cementing, for example) the module to the roof frame, and can have all important components of the openable roof (cover, cover raising and displacement guides or linkages, cover seals, drive motor, drive cable, etc.) already integrated on it.

Furthermore, if the guide rail is located underneath the lengthwise slot which remains between two fixed roof plates or roof plate sections, at least one cross support which extends over the width of the roof can be integrated on the roof module; in its center, the guide rail is supported or attached. Alternatively or in addition, to support or attach the guide rail under the longitudinal joint, there can also be a support element which is attached, especially cemented on either side of the slot, on the bottoms of the fixed roof plates.

If the guide rail is located underneath the lengthwise slot which remains between two movable or completely removable roof plate elements, on the roof module likewise at least one cross support which extends over the width of the roof can be integrated; in its middle the guide rail is supported or attached. Alternatively or in addition, to support or attach the guide rail under the aforementioned lengthwise joint, there can also be a carrier element which is provided on either side of the slot with seals which seal from the top towards the bottom of the roof plate elements.

The invention is further described below using embodiments with reference to the accompanying drawings.

DETAILED DESCRIPTION OF THE INVENTION

Figure 1:
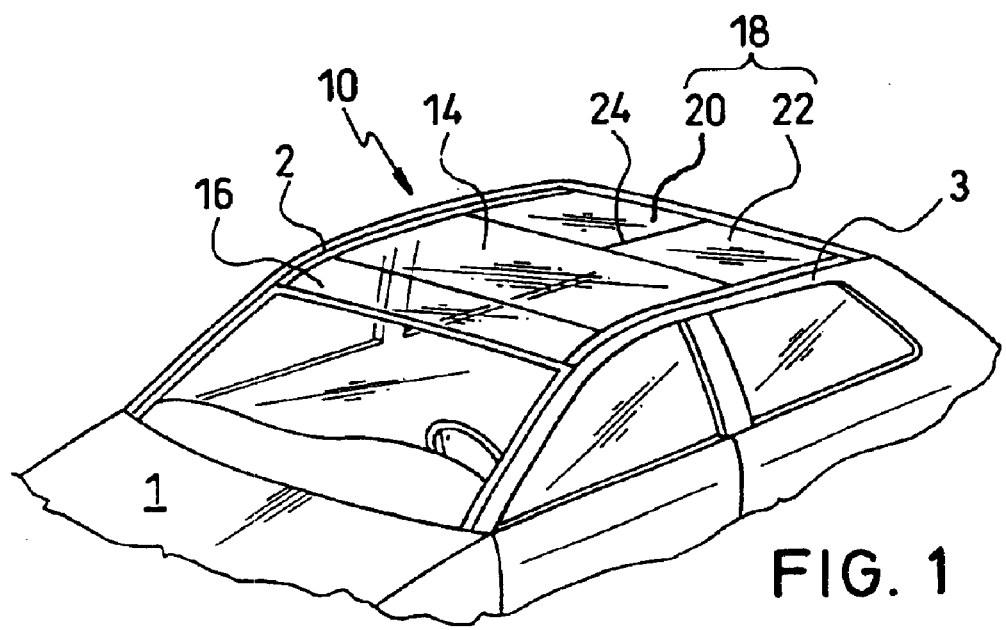
FIG. 1 is a schematic perspective of a motor vehicle roof with the cover in the closed position.
Figure 2:
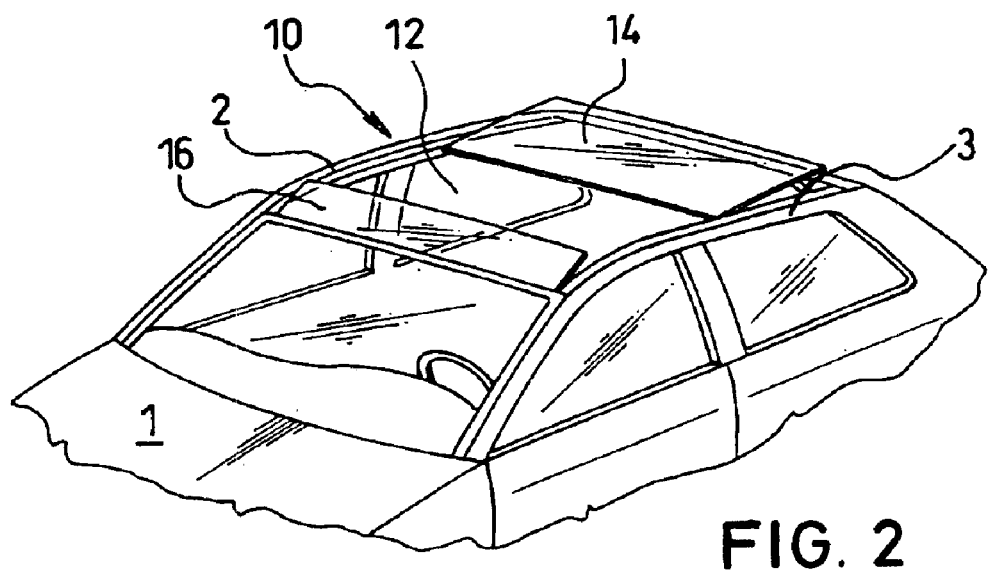
FIG. 2 is a schematic perspective of the motor vehicle roof from FIG. 1 in the fully open position.

FIGS. 1 & 2 show a motor vehicle roof 10 in the closed state (FIG. 1) and in a completely opened state (FIG. 2). The roof 10 is a prefabricated module which has been inserted into the roof frame of the vehicle body 1 and attached thereto. In the vehicle shown, this roof frame is formed by side members 2, 3 which run in the lengthwise direction of the vehicle and front and rear members which run crosswise.

The motor vehicle roof 10, in the manner known for lifting and sliding roofs, comprises a roof opening 12 in the fixed roof skin, a sliding and lifting cover 14 and an displacement mechanism (not shown) for moving the cover 14 between the closed position shown in FIG. 1 in which the cover 14 closes the roof opening 12, a ventilation position (not shown) in which the cover 14 is raised up out of its closed position so that its rear edge is above the fixed roof skin, and an open position in which the cover 14 is pushed to the rear so that at least part the cover extends over the fixed roof skin, for example, into the end position shown in FIG. 2.

Furthermore, n the embodiment shown, the roof 10 also comprises a wind deflector louver 16 which is located in the forward frame area and which is swung up by the displacement mechanism when the cover 14 is opened into the ventilation position or the open position for deflecting the airflow over the roof.

The motor vehicle roof 10 is inserted into the roof frame of the vehicle body 1 as a complete transparent panorama roof module that integrates the wind deflector louver 16, the cover 14 together with the displacement mechanism and a rear fixed roof plate 18 which is made in two parts, and which is composed of two stationary roof elements 20, 22 with a joint 24 between them which runs in the lengthwise direction of the motor vehicle. Alternatively, instead of the joint 24 there could also be a slot which does not run to the rear edge of the one-piece roof plate (if the intended cover adjustment path allows this).

Of course, on the bottom of the roof 10, in the conventional manner, there can be shade means for protection against the sun, in the rear area of the roof, for example, two separate shades for shading under the two stationary roof elements 20, 22.

A guide rail 26 runs underneath joint 24 for guiding a support lever 28 (compare FIGS. 3 & 4) which supports the cover 14 in its open position (compare FIGS. 2 & 4) near its rear edge.

Figure 3:
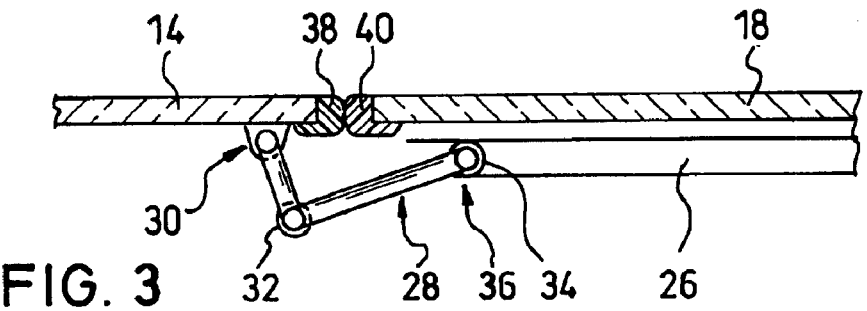
FIG. 3 is a schematic side view, partially in cross section, of a motor vehicle roof for illustration of important components of a cover support, the cover being closed.
Figure 4:
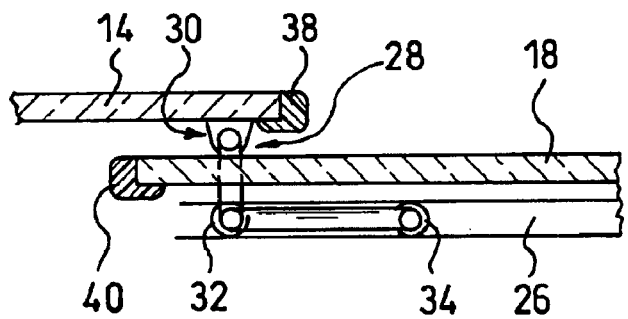
FIG. 4 shows a view corresponding to FIG. 3 in an open position, specifically with the cover partially opened.

FIGS. 3 & 4 schematically illustrate the arrangement of the guide rail 26 and the support lever 28 which is guided in it. The support lever 28, in this embodiment, is made as a linked lever with a front end which is pivotally coupled at 30 to the bottom of the cover and which in the link area has a front sliding or rolling element 32. On its back end, support lever 28 has a rear sliding or rolling element 34 which is held in the guide rail 26 so as to be able to move parallel to the roof plate 18 in the lengthwise direction of the motor vehicle, and the support lever 28 is able to pivot when element 34 is located at area 36.

In the closed position of the cover 14 as shown in FIGS. 1 & 3, the appearance of the motor vehicle roof 10 is smooth, the transition area between the cover 14 and the roof plate arrangement 18 being sealed by edge gap seals 38, 40, which are located on these components in a conventional arrangement. The support lever 28 is recessed here completely underneath the roof surface.

The cover 14 can be moved, proceeding from the closed position, by means of a known adjustment device, which therefore need not be explained in detail here, into a ventilation position, and further, into an open position so that, for example, the situation shown in FIG. 4 arises in which the cover 14 is pushed to the rear over part over the fixed roof skin 18. A mechanism which is suitable for raising and moving the cover 14 is described, for example, in German Patent DE 197 13 347 C1 and corresponding U.S. Pat. No. 6,158,803, with reference to FIGS. 3A to 4B there. A displacement mechanism which is likewise suitable for use in the invention can be found, for example, in the German Patent DE 42 38 946 C1.

When the motor vehicle roof 10 is opened, proceeding from the closed position as shown in FIG. 3, the cover 14 is pivoted by the displacement mechanism, first, around a pivot axis which lies near its front edge so that the rear edge of the cover is raised up above the roof skin 18, pivoting of the support lever 28 taking place around the rear sliding element 34 which is permanently engaged in the guide rail 26. In this raising motion, the front sliding element 32 is raised and runs into the guide rail 26 when the cover 14 is moved subsequently over the roof plate 18, and as the cover 14 continues to move to the rear together with the rear sliding element 34, there is a torsionally strong support of the cover 14 which can move lengthwise along the guide rail 26.

The cover 14 is then held at three points, specifically by two conventional front guides and the rear middle support.

In the transition from the ventilation position into the open position of the cover 14, the top (cover-side) end of the support lever 28 swings up with local displacement of the edge gap seals 42, 44. In the open position of the cover 14, the support lever 28 defines the distance of the coupling 30 from the roof plate 18, this distance being constant over the further path of displacement of the cover (compare FIGS. 4 & 7).

The support lever 28 only passively participates in the raising or lowering position of the cover 14. This motion is driven rather by the displacement mechanism which is located on each side of the roof opening 12 underneath the roof surface. When the cover 14 is moved to the rear, the support lever 28 provides stable support for the cover 14 starting from the instant at which the two sliding elements 32, 34 are engaged to the guide rail 26.

In the open position of the cover 14, the sliding elements 32, 34 at the same height. This height can be the same height which the front sliding element 32 assumes with maximum raising of the cover in the ventilation position. However, depending on the configuration of the displacement mechanism, the latter height can also be different simply as long as it is ensured that, in the transition from the ventilation position into the open position, the height of the front sliding element 32 is changed for reliable running into the guide rail 26, or running-in by a suitably shaped entry surface of the guide rail 26 is ensured.

Figure 5:
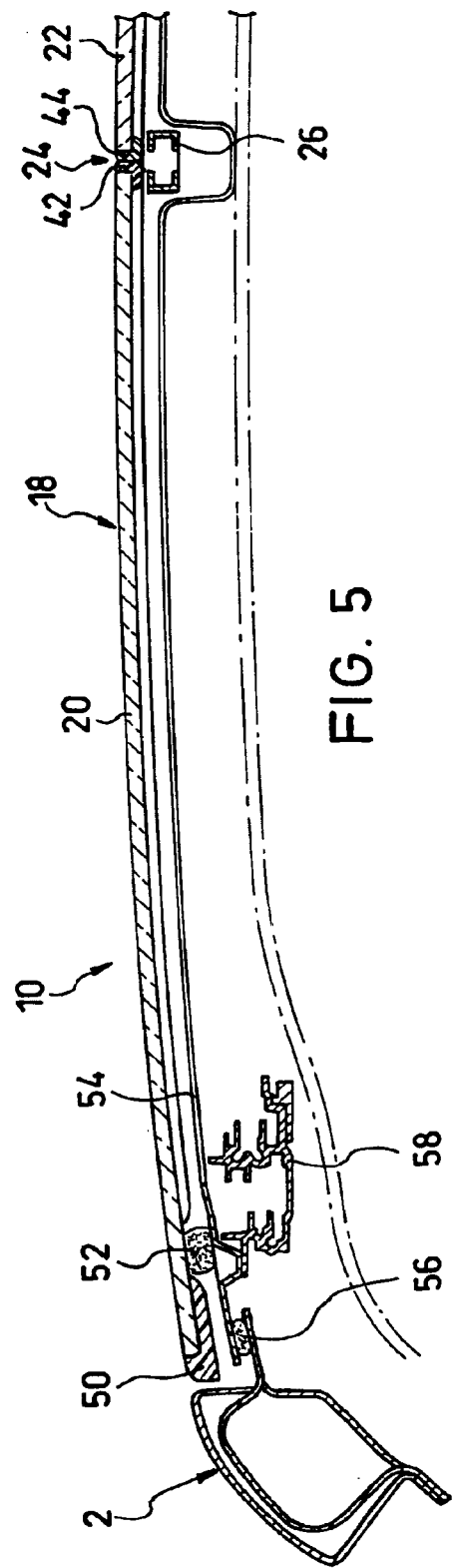
FIG. 5 is a partial cross-sectional view of the motor vehicle roof in the area behind the roof opening, in which a cross support which extends over the width of the roof runs.

FIG. 5 shows a potion of the motor vehicle roof 10 from the right side member 2 of the vehicle body 1 as far as the area which lies in the middle of the vehicle, in cross section. The motor vehicle roof 10 continues symmetrically as far as the right side member 3. The cutting plane from FIG. 5 runs in the front area of the two-part roof plate 18 which extends with edge-side peripheral foaming 50 (here: PU) into the area of the side member 2 and is attached via cement 52 to the motor vehicle roof module frame which forms a cross support 54 which runs over the width of the roof in the illustrated area. The module frame is seated in the roof frame area of the vehicle body 1 and is cemented to it in vehicle installation. In the figure, for example, a cement bead 56 is shown with which one side edge of the cross support 54 is linked to the top of the inside support edge of the side member 2. Furthermore, a profile structure 58, which runs in the lengthwise direction of the vehicle and forms part of the displacement mechanism, is screwed to the bottom of the module frame.

In the area of the longitudinal centerline of the vehicle, the downwardly recessed area of the cross support 54 is used to accommodate the guide rail 26 in the roof module. Since the lateral edge of the roof plate 18 overlaps the support edge of the side member 2 in the transverse direction, the peripheral foam 50 or a screen located in this area can be made very narrow. Thus, there is especially high light translucency of the roof 10 which is advantageous for a "panorama effect". Fundamentally, it is even possible to omit the peripheral foam 50, especially when the roof trough has a water drainage function and need not be specially sealed.

Figure 6:
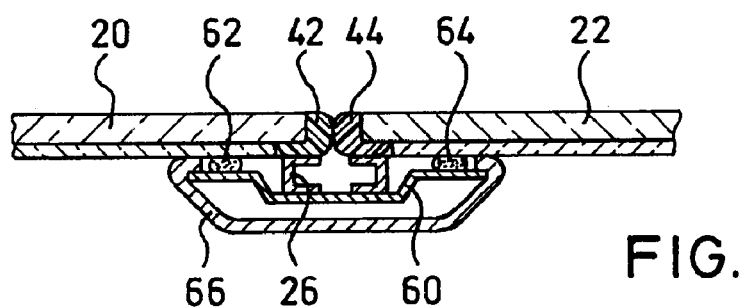
FIG. 6 is a partial cross-sectional view of the motor vehicle roof in a different area behind the roof opening in which the guide rail is supported by a carrier element.

FIG. 6 shows a sectional view corresponding to the area (middle of the vehicle) which is on the right in FIG. 5, in an area farther to the rear viewed in the lengthwise direction of the vehicle. Here, the guide rail 26 is accommodated in a carrier part 60 which is designed specifically for this purpose. Guide rail 26 is fixed on each side of the vehicle centerline on the bottom of the fixed roof elements 20, 22, by means of cement beads 62, 64 and is covered on the bottom towards the vehicle interior with a lining strip 66.

Figure 7:
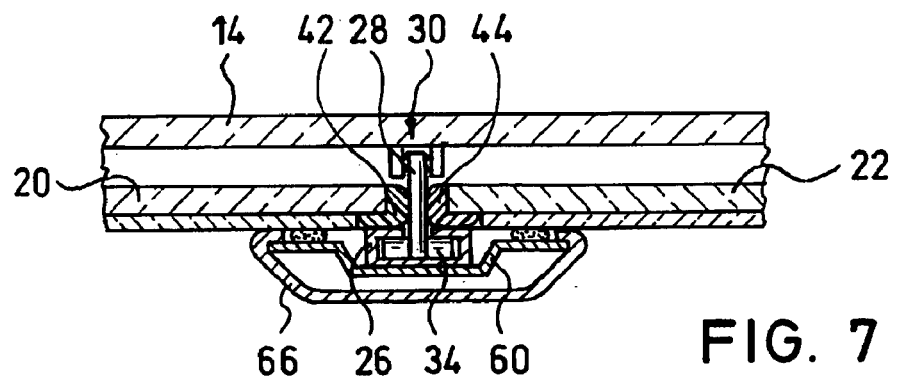
FIG. 7 shows a cross-sectional view of the motor vehicle roof similar to FIG. 6, in which a support lever which is guided in the guide rail can be recognized.

FIG. 7 is a view corresponding to FIG. 6 with the cover 14 opened, in which the support lever 28 is visible. It clearly shown that, in the open position, the support lever 28 locally displaces the edge gap seals 42, 44 for providing the central support of the rear edge of the cover 14.

In the following description of other embodiments, the same reference numbers are used for analogous components, but with a lowercase letter added to distinguish the embodiment. Here, essentially only the differences from the already described embodiment or embodiments are examined, and otherwise, reference should be made expressly to the description of prior embodiments.

Figure 8:
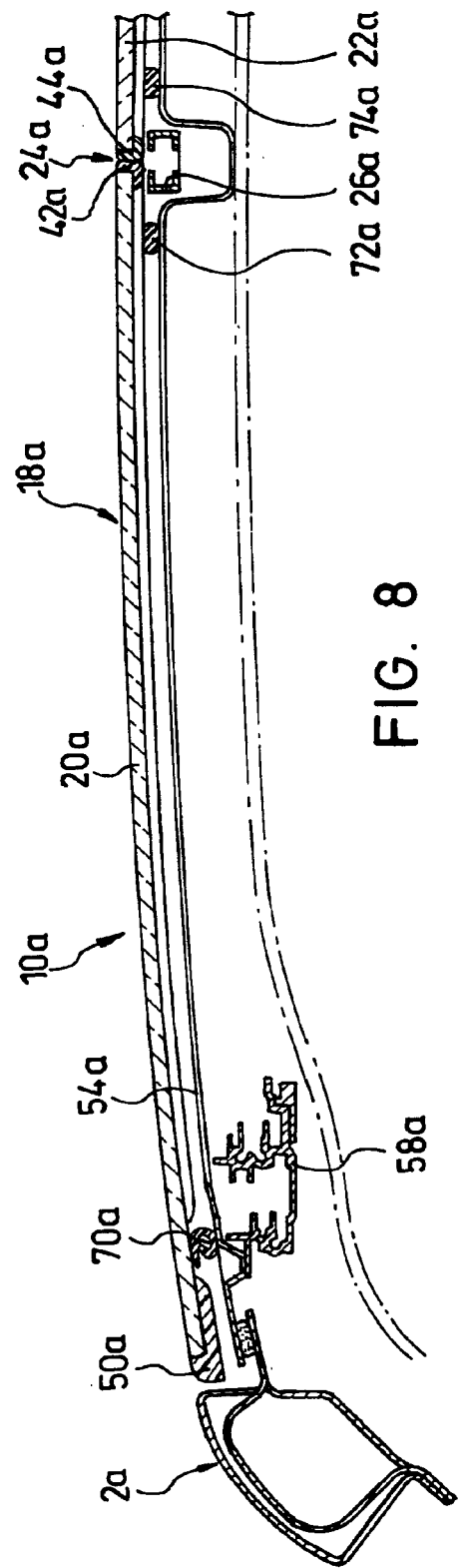
FIG. 8 shows a view of the motor vehicle roof corresponding to FIG. 5 according to another embodiment in which two rear roof plate elements are removable.

FIG. 8 shows (similarly to FIG. 5) a vehicle roof 10a according to another embodiment. In contrast to the roof shown in FIG. 5, there is a removable two-part roof plate 18a (stationary elements 20a, 22a) here.

The roof plate 18a is sealed by means of a laterally running seal 70a towards the vehicle roof module frame which, in this area, again, forms a cross support 54a which runs over the width of the roof. In the center area of the roof, sealing takes place by means of seals 72a, 74a which run on each side of the guide rail 26a. Holding means (not shown here) are provided to hold the stationary roof elements 20a, 22a. In an unillustrated alternative arrangement, the elements 20a, 22a are provided as raisable covers which can be pivoted forward and/or backward beyond the roof plane.

In the area of the longitudinal center line of the vehicle, the recessed area of the cross support 54a is again used to house the guide rail 26a.

Figure 9:
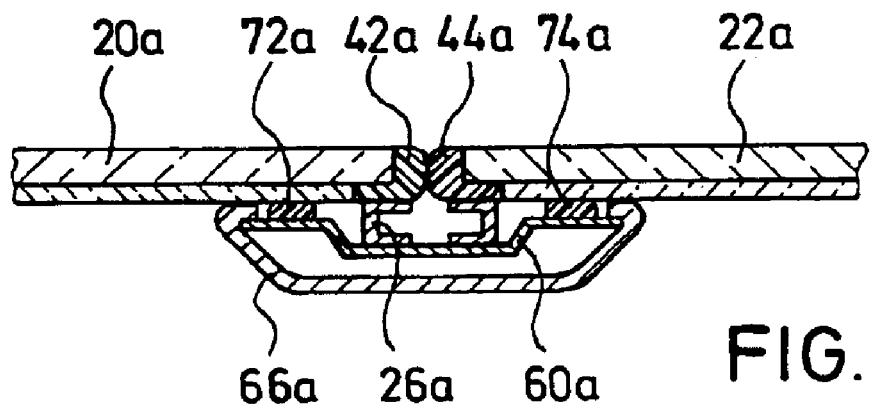
FIG. 9 is a partial cross-sectional view of the motor vehicle roof which is shown in FIG. 8 in another area behind the roof opening in which the guide rail is supported by a roof-mounted carrier element.

FIG. 9 shows a sectional view which corresponds to the area (vehicle middle) which is on the right in FIG. 8 in the area farther to the rear viewed in the lengthwise direction of the vehicle. Here, the guide rail 26a is accommodated in a carrier part 60a which is designed specifically for this purpose. The carrier part 60a supports and seals the bottom of the stationary roof elements 20a, 22a on each side of the vehicle longitudinal centerline by means of seals 72a, 74a.

After removing the roof plate-elements 20a, 22a, in this embodiment, the guide rail 26a is exposed from above. In order to prevent this, for example, to improve aesthetics, there can be an execution as shown in FIG. 10.

Figure 10:
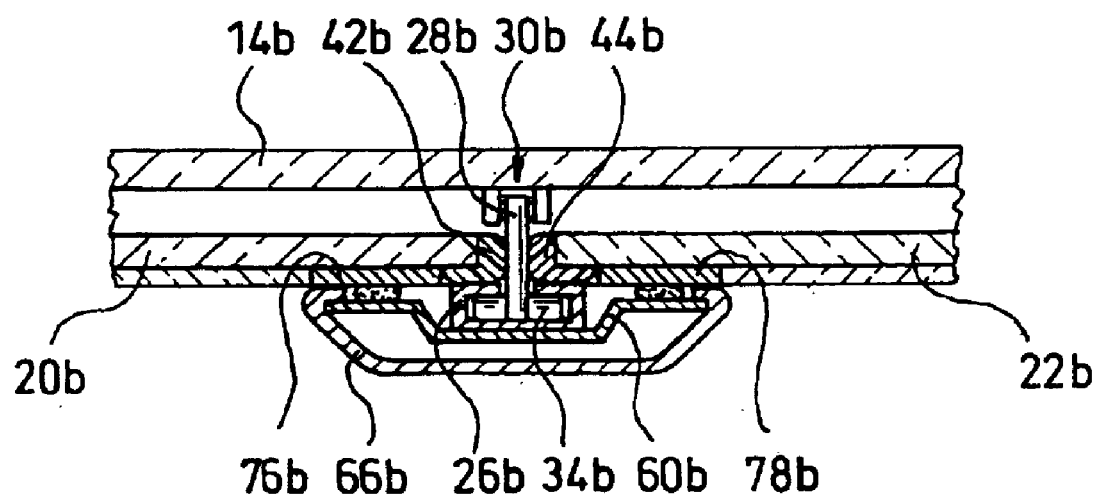
FIG. 10 is a view of the motor vehicle roof corresponding to FIG. 9 according to another embodiment in which there is a central roof skin crosspiece which covers the guide rail.

FIG. 10 is a view corresponding to FIG. 9 (or FIG. 6) with the cover 14b opened, in which the support lever 28b is again visible.

Towards the middle of the roof, the two roof elements 20b, 22b, in this embodiment, end roughly at the height of the side edges of the central lining. The inner edges of the elements 20b, 22b rest (via seals) on a roof center crosspiece, which is mounted on the roof. This center crosspiece forms a fixed part of the roof skin which is located behind the roof opening and bridges the space between the element edges. FIG. 10 shows two center crosspiece halves 76b, 78b, between which there is, again, a displaceable sealing arrangement 42b, 44b, and the carrier part 60b is joined to their under sides via cement beads.

In summary, the invention calls for a vehicle roof with a roof opening which is made in the roof skin (20, 22), a cover (14) and an displacement mechanism for moving the cover (14) between the closed position which closes the roof opening, a ventilation position in which the cover (14) is raised up at its rear edge above the fixed roof skin (20, 22), and an open position in which the cover (14) is pushed to the rear over at least partially over the roof skin (20, 22), and is supported at its rear area by means of a support lever (28) which is coupled (30), on the one hand, in the rear area of the cover (14), and on the other, is guided in a guide rail (26) which is located underneath the roof skin (20, 22), for providing such a vehicle roof with greater freedom in the configuration of the side roof edge area because the support lever (28) and the guide rail (26) are located essentially in the transverse center of the vehicle roof.

What is claimed is:

1. Motor vehicle roof, comprising:

a roof skin, a roof opening in the roof skin, a cover for opening and closing said roof opening, said cover being mounted for displacement between a closed position closing the roof opening, a ventilation position in which the cover is pivoted upward around a pivot axis near a front edge of the cover so as to have a rear edge of the cover located above the height of the roof skin, and an open position in which at least a portion of the upwardly pivoted cover is pushed to rearward over the roof skin, and a support lever for supporting a rear area of the cover in the ventilation and open positions which includes a first pivotable end, a second end, and a hinge joint between the first end and second of the support lever, wherein said support lever is coupled at the first pivotable end to a rear area of the cover and the second end is guided within a channel of a guide rail located underneath the roof skin, wherein, during displacement of the cover from the closed to the ventilating and open positions, the hinge joint is raised into the channel of the guide rail, and the first end of the support lever is elevated above the roof skin, and wherein the support lever and the guide rail are located essentially in a transversely central portion of the motor vehicle roof.

2. Motor vehicle roof as claimed in claim 1, wherein a section of the roof skin located behind the roof opening is formed by a transparent roof plate which extends laterally into areas of vehicle body side members in an installed state of the roof.

3. Motor vehicle roof as claimed in claim 1, wherein at least one of a section of the roof skin located behind the roof opening and the cover are transparent.

4. Motor vehicle roof as claimed in claim 1, wherein the roof is a prefabricated roof module for installation as a unit on a roof frame of a vehicle body.

5. Motor vehicle roof as claimed in claim 1, wherein the roof skin comprises stationary panels located rearward of the roof opening.

6. Motor vehicle roof as claimed in claim 1, wherein the roof skin comprises removable panels located rearward of the roof opening.

7. Motor vehicle, comprising:

a vehicle body having a roof frame with vehicle body side members, a roof skin, a roof opening in the roof skin, a cover for opening and closing said roof opening, said cover being mounted for displacement between a closed position closing the roof opening, a ventilation position in which the cover is pivoted upward around a pivot axis near a front edge of the cover so as to have a rear edge of the cover located above the height of the roof skin, and an open position in which at least a portion of the upwardly pivoted cover is pushed to rearward over the roof skin, and a support lever for supporting a rear area of the cover in the ventilation and open positions which includes a first pivotable end, a second end, and a hinge joint between the first end and second end of the support lever, wherein said support lever is coupled at the first pivotable end to a rear area of the cover and the second end is guided within a channel of a guide rail located underneath the roof skin, wherein, during displacement of the cover from the closed to the ventilating and open positions, the hinge joint is raised into the channel of the guide rail and the first end of the support lever is elevated above the roof skin, and wherein the support lever and the guide rail are located essentially in a transversely central portion of the motor vehicle roof.

8. Motor vehicle as claimed in claim 7, wherein a section of the roof skin located behind the roof opening is formed by a transparent roof plate which extends laterally into areas of the vehicle body side members.

9. Motor vehicle as claimed in claim 7, wherein at least one of a section of the roof skin located behind the roof opening and the cover are transparent.

10. Motor vehicle as claimed in claim 7, wherein the roof is a prefabricated roof module installed as a unit on die roof frame of the vehicle body.

11. Motor vehicle roof as claimed in claim 7, wherein the roof skin comprises stationary panels located rearward of the roof opening.

12. Motor vehicle roof as claimed in claim 7, wherein the roof skin comprises removable panels located rearward of the roof opening.

* * * * *